United States Patent
Thota et al.

(10) Patent No.: US 8,894,124 B2
(45) Date of Patent: Nov. 25, 2014

(54) VEHICLE LOAD FLOOR ASSEMBLY

(71) Applicant: Ford Global Technologies, LLC, Dearborn, MI (US)

(72) Inventors: Bhavani Thota, Sterling Heights, MI (US); Michael James Whitens, Milford, MI (US); Gian Carlo Morlet Ugalde, Huxquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/842,306

(22) Filed: Mar. 15, 2013

(65) Prior Publication Data

US 2014/0265411 A1 Sep. 18, 2014

(51) Int. Cl.
*B60R 5/04* (2006.01)
*B60N 2/36* (2006.01)

(52) U.S. Cl.
CPC .... *B60N 2/36* (2013.01); *B60R 5/04* (2013.01)
USPC ................. 296/37.16; 296/65.09; 296/65.16

(58) Field of Classification Search
USPC ........ 296/37.5, 37.8, 37.16, 64, 65.01, 65.05, 296/65.09, 65.16, 66, 69; 297/129, 354.1
See application file for complete search history.

(56) References Cited

U.S. PATENT DOCUMENTS

| | | | |
|---|---|---|---|
| 3,604,022 A | 9/1971 | Smith | |
| 4,428,611 A | 1/1984 | Widmer | |
| 4,443,034 A | 4/1984 | Beggs | |
| 5,322,335 A | 6/1994 | Niemi | |
| 6,089,641 A | 7/2000 | Mattarella et al. | |
| 6,698,829 B1 | 3/2004 | Freijy et al. | |
| 6,702,355 B1 * | 3/2004 | Price et al. | 296/37.16 |
| 8,353,550 B1 * | 1/2013 | Lucas | 296/37.16 |
| 8,505,999 B2 * | 8/2013 | Whalen et al. | 296/65.09 |
| 8,528,957 B2 * | 9/2013 | Ugalde et al. | 296/24.43 |
| 2003/0057724 A1 * | 3/2003 | Inagaki et al. | 296/37.8 |
| 2009/0108639 A1 | 4/2009 | Sturt et al. | |
| 2011/0133508 A1 * | 6/2011 | Zuelch | 296/65.16 |
| 2013/0001972 A1 * | 1/2013 | Ugalde et al. | 296/24.43 |
| 2013/0147226 A1 * | 6/2013 | Cao et al. | 296/37.16 |

FOREIGN PATENT DOCUMENTS

JP 2003300431 A1 10/2003

OTHER PUBLICATIONS

AutoTruckToys.com. Printed Apr. 1, 2013, "Mopar OEM Dodge Ram Flat Load Floor". http://www.autotrucktoys.com/ram/Mopar-OEM-Dodge-Ram-Flat-Load-Floor-PRD27019.aspx. 1 page.
Plunkett, Bob. www.carlist.com. Publication Date Mar. 21, 2011, "2011 GMC Acadia Denali CUV". http://www.carlist.com/newcars/newcarphp?id=2051&yr=n. 2 pages.

* cited by examiner

*Primary Examiner* — Glenn Dayoan
*Assistant Examiner* — Jason S Daniels
(74) *Attorney, Agent, or Firm* — Vivhit Chea; Price Heneveld LLP

(57) ABSTRACT

A load floor assembly for a vehicle includes a seatback that pivots between an upright position and a stowed position. A cargo floor extends rearward of the seatback, and a load panel is coupled with the cargo floor. The load panel moves between a rearward position and a forward position. In the forward position, the load panel extends over at least a lower portion of the seatback in the stowed position.

17 Claims, 8 Drawing Sheets

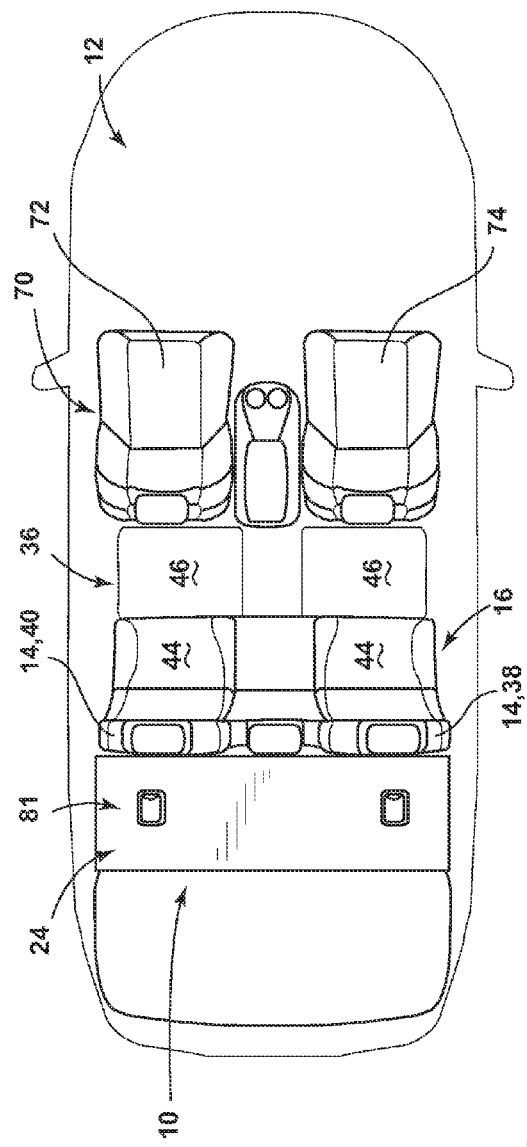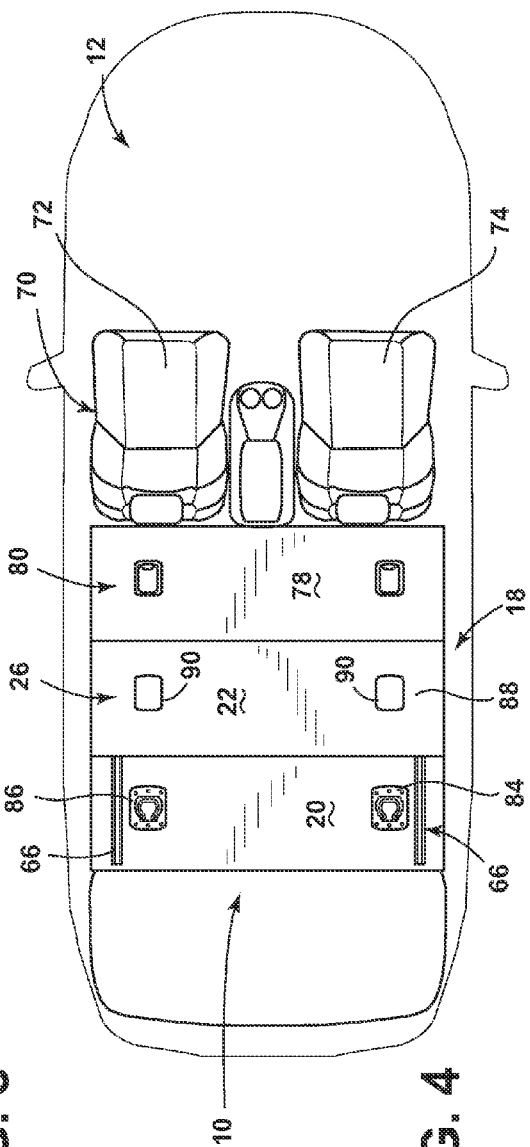

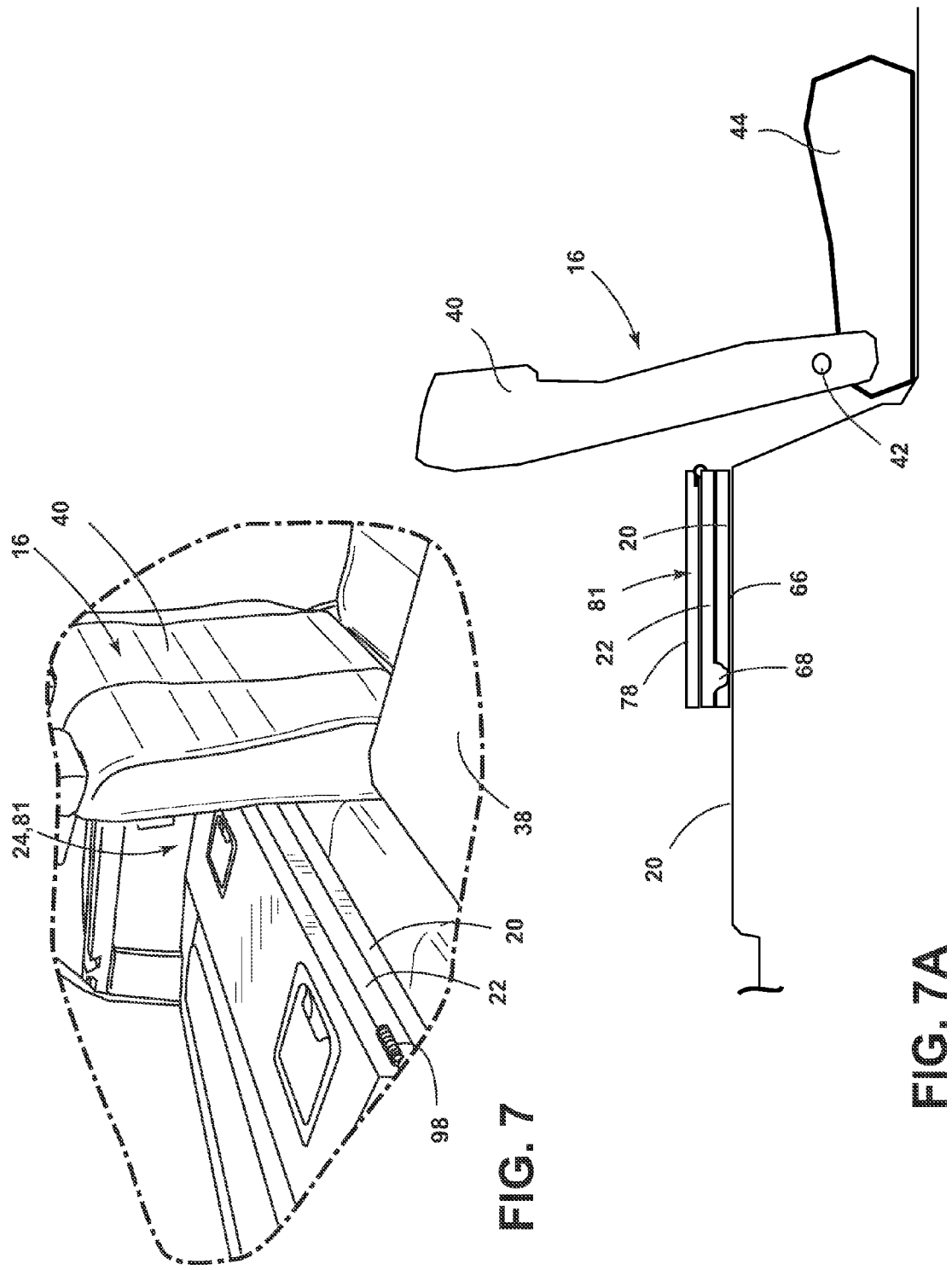

VEHICLE LOAD FLOOR ASSEMBLY

FIELD OF THE INVENTION

The present invention generally relates to a load floor assembly, and more specifically to a vehicle load floor assembly for a cargo floor.

BACKGROUND OF THE INVENTION

It is common for vehicles to include a cargo area behind a rear row of seats within the vehicle. Typically, the cargo area is defined between a floor extending between the rear row of seats and a rear opening of the vehicle. In some instances, the rear row of seats may be collapsible to expand the cargo area forward. Upon collapsing the seats, the floor of the cargo area may be uneven or otherwise unfit for supporting items or objects that are preferably transported on a substantially flat surface. In addition, the cargo areas of some modern vehicles are becoming more constricted due to smaller vehicle sizes as well as being restricted with additional vehicle components, such as batteries or fuel cells, which may cause the floor to have uneven, raised, or inconsistent surfaces.

SUMMARY OF THE INVENTION

According to one aspect of the present invention, a load floor assembly for a vehicle includes a seatback that pivots between an upright position and a stowed position. A cargo floor extends rearward of the seatback, and a load panel is coupled with the cargo floor. The load panel is movable between a rearward position and a forward position. In the forward position, the load panel extends over at least a lower portion of the seatback in the stowed position.

According to another aspect of the present invention, a vehicle load floor assembly includes a vehicle seat having a seatback that pivots to a collapsed position. A cargo area has a floor that is rearward of the seat. A load panel is coupled with the floor and is slidable from a rear position to a forward position extending over the seatback in the collapsed position. An extension panel is coupled with the load panel and is deployable forward from the load panel in the forward position.

According to yet another aspect of the present invention, a load floor assembly for a vehicle includes a track assembly configured to engage a cargo floor of the vehicle. A load panel is coupled with the track assembly for sliding to a forward position in general alignment with and beyond a forward region of the cargo floor. An extension panel is pivotally coupled with a front portion of the load panel and pivots to a deployed position in alignment with the load panel.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a top plan view an interior portion of the vehicle, showing the seatbacks of the rear row of seating in an upright position;

FIG. 4 is a top plan view of the interior portion of the vehicle, showing the seatbacks of the rear row of seating in the forward stowed position and a load panel and an extension panel extending from a cargo floor over the rear row of seating;

FIG. 7 is a top perspective view of the load floor assembly with a seatback of the rear row of seating in the upright position;

FIG. 7A is a schematic side elevational view of the load floor assembly, as shown in FIG. 7, having the load panel in a rearward position;

DETAILED DESCRIPTION OF THE PREFERRED EMBODIMENTS

Figure 1:
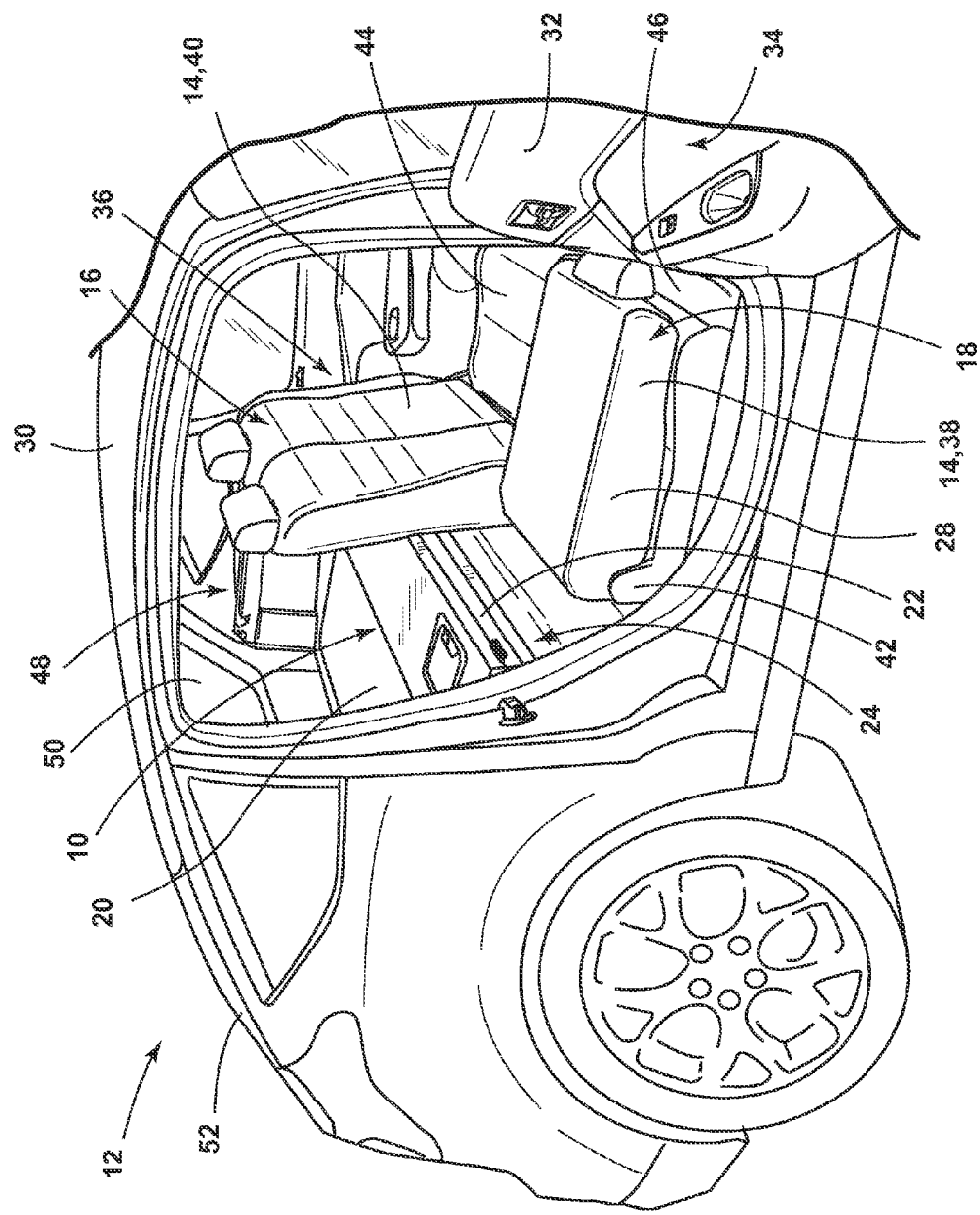
FIG. 1 is a top perspective view of a vehicle having a side door open to reveal a seatback of a rear row of seating in a forward stowed position to expose a cargo area.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments illustrated in FIGS. 1-9A, reference numeral 10 generally designates a load floor assembly for a vehicle 12 that includes a seatback 14 pivotal between an upright position 16 and a stowed position 18. A cargo floor 20 extends rearward of the seatback 14, and a load panel 22 couples with the cargo floor 20. The load panel 22 is movable between a rearward position 24 and a forward position 26. In the forward position 26, the load panel 22 extends over at least a lower portion 28 of the seatback 14 in the stowed position 18.

Referring now to the embodiment illustrated in FIG. 1, showing a rear section 30 of the vehicle 12 is shown with a passenger side door 32 in an open position 34 revealing a rear side door opening. In the illustrated embodiment, the vehicle 12 is shown having a rear row of seating 36 adjacent the rear side door opening. It is contemplated that other vehicle types with various seating arrangements may be incorporated with a load floor assembly 10 as described herein. For instance, a sport utility vehicle having a third row rearward the rear side door openings, a passenger van having a single sliding door opening and a number of rows of seating, or other conceivable vehicles with alternative seating arrangements from those illustrated. In the illustrated embodiment, the rear row of seating 36 includes a 60/40 division, such that the rear row of seating 36 has a first seatback 38 and a second seatback 40 disposed laterally adjacent to each other. The first seatback 38 occupies substantially forty percent of the rear row of seating 36 and the second seatback 40 occupies substantially sixty percent of the rear row of seating 36. The first and second seatbacks 38, 40 are each pivotal between the upright position 16 and the forward stowed position 18, pivoting about a pivotal connection 42 between the seatback 14 and a seat 44 that is coupled rearward a foot well 46. The first seatback 38 is shown in the forward stowed position 18 and the second seatback 40 is shown in the upright position 16. Accordingly, the first and second seatbacks 38, 40 are independently pivotal. As shown, the first seatback 38 is pivoted to the forward stowed position 18, revealing a cargo area 48 of the vehicle 12. The cargo area 48 spans rearward from the seatback 14 to a rear opening 50 of the vehicle 12 that is enclosed with a hatch door 52. Again, it is contemplated that the rear opening 50 may be alternatively enclosed with a trunk, a pair of vertical doors, or other conceivable rear opening 50 enclosures, as generally understood by one having ordinary skill in the art.

Figure 2:
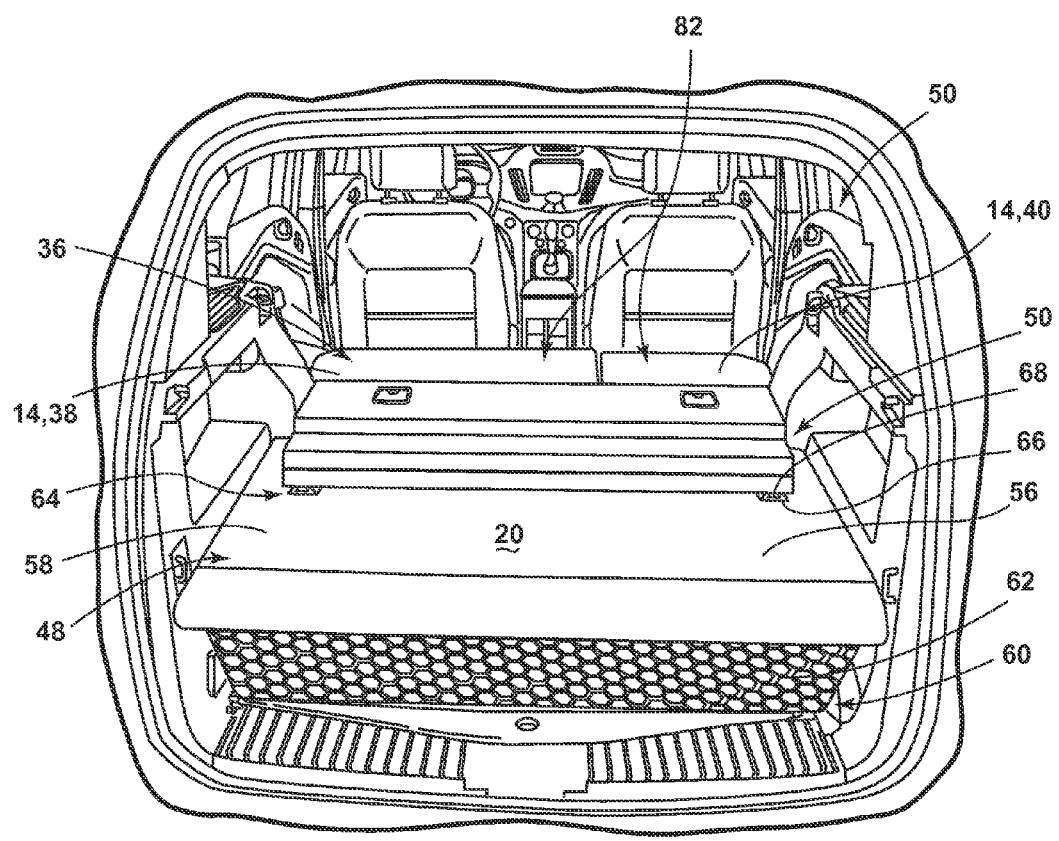
FIG. 2 is a top perspective view of a rear opening of the vehicle, showing the cargo area and the seatbacks of the rear row of seating in the forward stowed position.

As illustrated in FIG. 2, the cargo area 48 includes the cargo floor 20 extending rearward from the first and second seatbacks 38, 40 of the rear row of seating 36. A forward region 54 of the cargo floor 20 includes an elevated portion 56 having a substantially horizontal top surface 58 that is elevated above a rearward region 60 of the cargo floor 20 proximate the rear opening 50 (FIG. 1). The elevated portion 56 of the cargo floor 20 is further defined by a substantially vertical mesh curtain 62 that extends from the rearward region 60 of the cargo floor 20 to the top surface 58 of the elevated portion 56. The elevated portion 56 may be adapted to conceal a spare tire, a storage compartment, and a battery used to operate the vehicle 12, or to cover other vehicle components. It is also conceivable that the lower portion 28 of the rearward region 60 of the cargo floor 20 may extend further forward to occupy more of the central region of the cargo area 48. Additionally, it is contemplated that the cargo area 48 may alternatively include a more elevated portion 56 rearward the forward region 54 of the cargo area 48.

As also shown in FIG. 2, a track assembly 64 is coupled between the load panel 22 and the top surface 58 of the elevated platform. As such, the track assembly 64 substantially supports the load panel 22 above the cargo floor 20. The track assembly 64 includes a pair of longitudinally extending rails 66 positioned proximate the lateral edges of the load panel 22. A pair of sliders 68 is coupled with the load panel 22 and each slider 68 is positioned to slidably engage the rails of the track assembly 64. It is also contemplated that alternative track assemblies or sliding features may be employed between the cargo floor 20 and the load panel 22. For instance, the track assembly 64 may include a motorized actuator to automatically slide the sliders 68 relative to the rails for positioning the load panel 22 between the rearward and forward positions 24, 26.

Referring now to FIGS. 3-4, a front row of seating 70 is disposed forward the rear row of seating 36 and includes a driver seat 72 and a passenger seat 74, as generally understood in the art. As shown in FIG. 3, the first and second seatbacks 38, 40 of the rear row of seating 36 are in the upright positions 16. Also, the load panel 22 is in the rearward position 24 on the track assembly 64, positioning a front edge 76 of the load panel 22 in close proximity with the first and second seatbacks 38, 40 of the rear row of seating 36. As shown in FIG. 4, the first and second seatbacks 38, 40 are moved to the forward stowed positions 18 and the load panel 22 is moved to the forward position 26 extending over the lower portion 28 of the seatbacks 14. In addition, an extension panel 78 that is coupled with the load panel 22 is moved forward to a deployed position 80 substantially concealing an upper portion 82 (FIG. 2) of the first and second seatbacks 38, 40 of the rear row of seating 36. As shown, the extension panel 78 in the deployed position 80 is in close proximity and may be contacting the driver and passenger seats 72, 74 in the front row of seating 70. With the load panel 22 moved to the forward position 26, a first tie-down connector 84 and a second tie-down connector 86 are exposed. The tie-down connectors 84, 86 are fastened to the elevated platform of the cargo floor 20, inboard the pair of rails of the track assembly 64. It is also conceivable that the tie-down connectors 84, 86 may be alternatively arranged on or coupled with the cargo floor 20. Further, it is contemplated that the rails of the track assembly 64 may similarly be otherwise arranged on the cargo floor 20.

Figure 5:
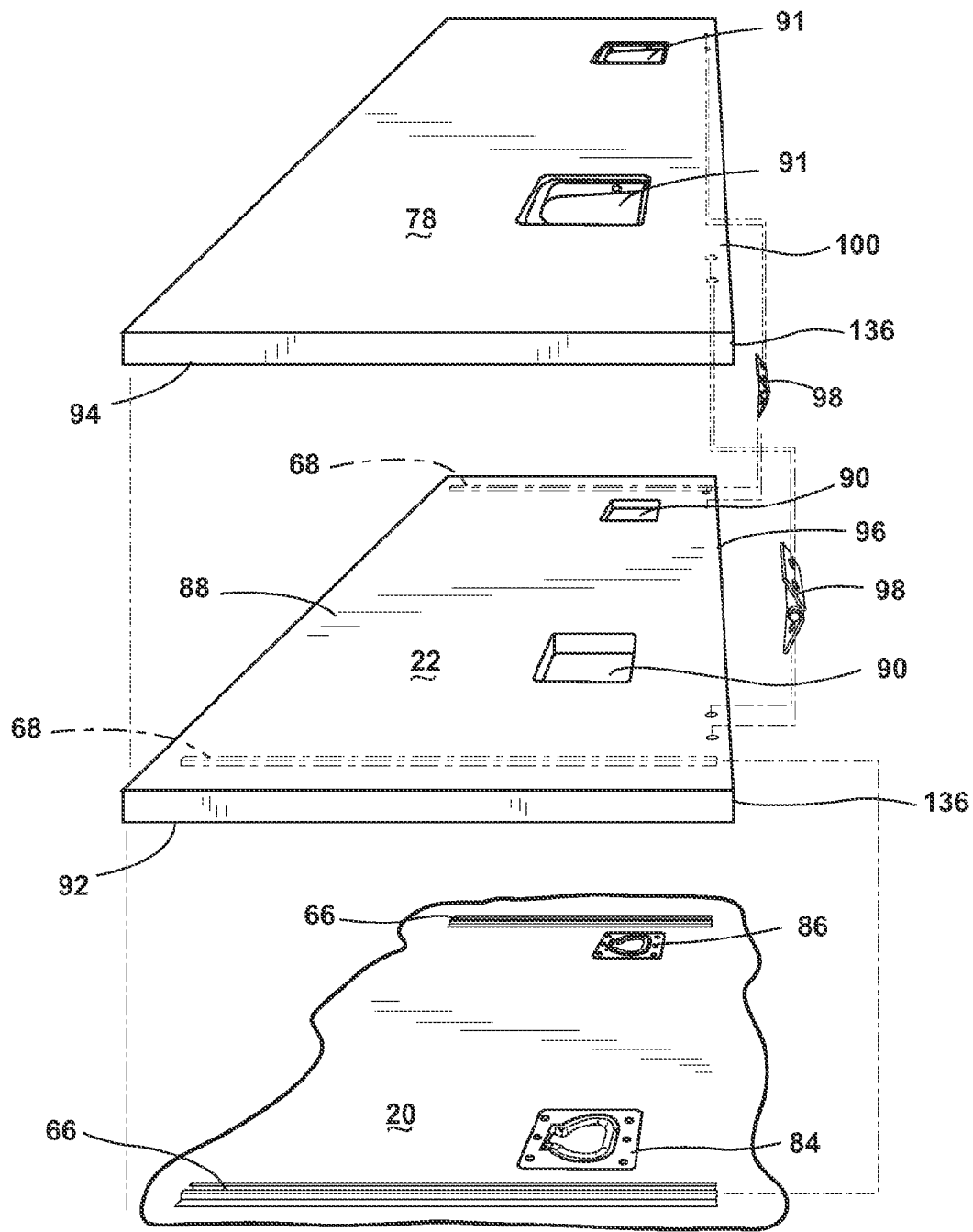
FIG. 5 is an exploded top perspective view of the load floor assembly, showing the extension panel, the load panel, and the cargo floor having a pair of tie-down connectors.

As shown in FIG. 5, a top surface 88 of the load panel 22 is shown having a pair of access apertures 90 extending from the top surface 88 down through the load panel 22 proximate the first and second tie-down connectors 84, 86. Accordingly, the pair of access apertures 90 are longitudinally aligned with the tie-down connectors 84, 86 on the cargo floor 20 when the load panel 22 is in the rearward position 24 on the track assembly 64. In addition, a pair of entry apertures 91 extend through the extension panel 78 in alignment with the access apertures 90 and the tie-down connectors 84, 86. As also shown, the pair of sliders 68 of the track assembly 64 are disposed on a bottom surface 92 of the load panel 22 to slidably engage the rails of the track assembly 64 disposed on the elevated portion 56 of the cargo floor 20.

The extension panel 78 as further illustrated in FIG. 5, includes a support surface 94 configured to support at least one cargo item when the extension panel 78 is moved to the deployed position 80 (FIG. 4). In a non-deployed position 81 (FIG. 3), the support surface 94 of the extension panel 78 abuts the top surface 88 of the load panel 22. The extension panel 78 is pivotally coupled with a forward edge 96 of the load panel 22 to provide a lateral axis for pivoting the extension panel 78 between the deployed and non-deployed positions 80, 81. More specifically, as shown, a pair of hinges 98 are coupled between the forward edge 96 of the load panel 22 and an inside edge 100 of the extension panel 78. It is also contemplated, that other pivotal connections 42 may be employed between the load panel 22 and the extension panel 78, such as a living hinge arrangement, a piano hinge, more or fewer hinges 98, or other connections as generally understood by one having ordinary skill in the art.

Figure 6:
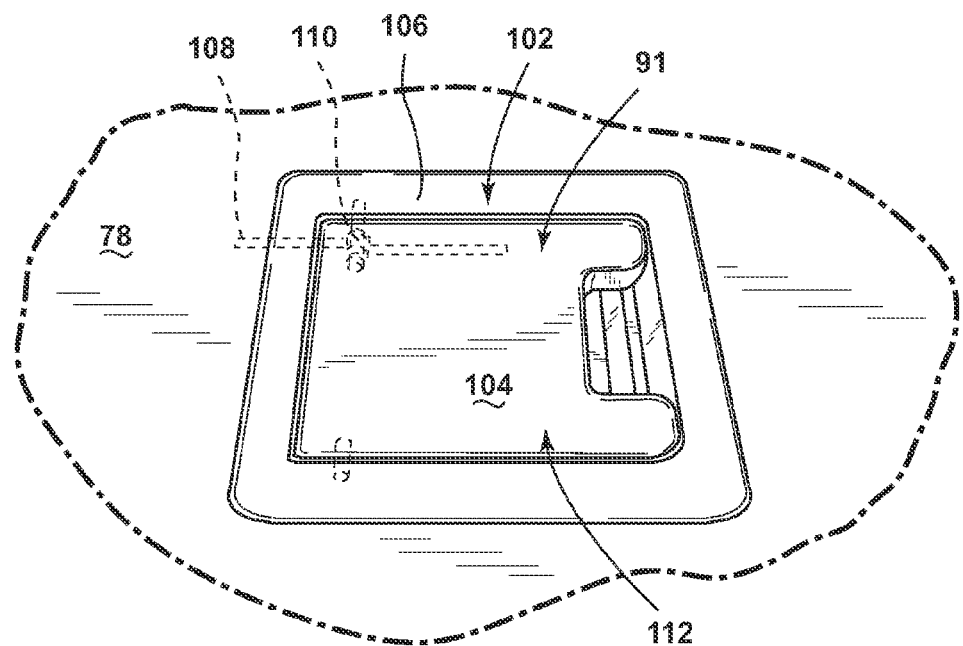
FIG. 6 is a top perspective view of a door on the extension panel for concealing the tie-down connector on the cargo floor.
Figure 6A:
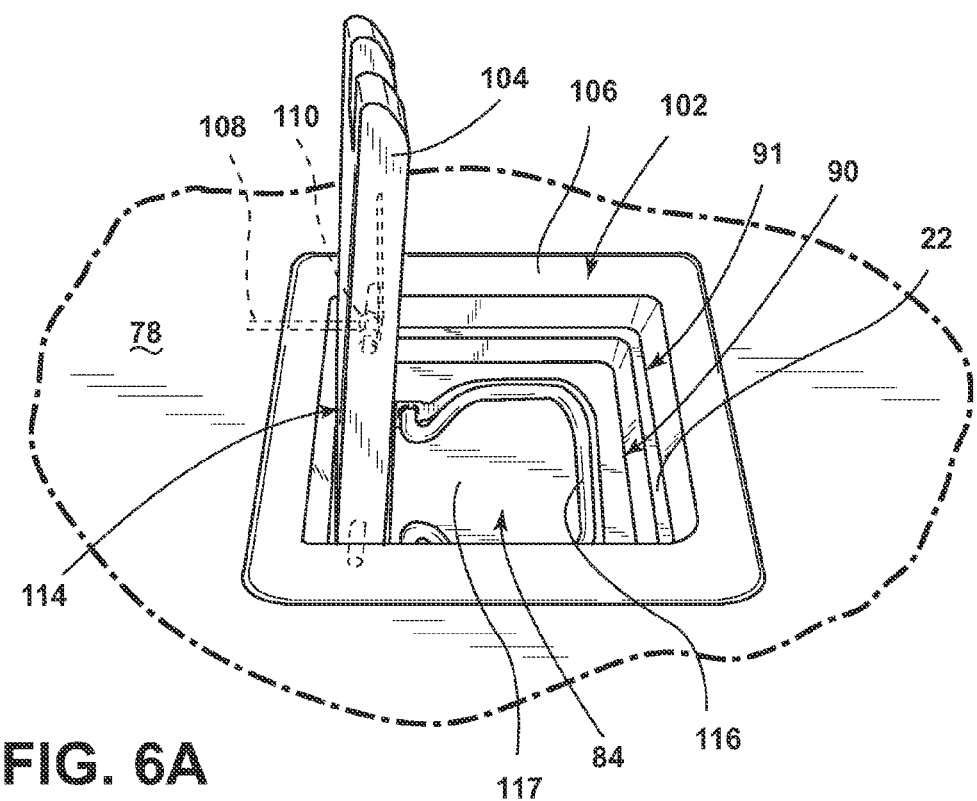
FIG. 6A is a top perspective view of the door pivoted to an open position for accessing the tie-down connector.

Referring now to FIGS. 6-6A, a door covering 102 is disposed on the extension panel 78 proximate each of the entry apertures 91. The door covering 102 includes a door 104 pivotally coupled to a periphery 106 of the entry aperture 91. The entry aperture 91 is aligned with the access aperture 90 when the extension panel 78 is in the non-deployed position 81 (FIG. 3). A retention spring 108 is coupled with the extension panel 78 proximate a pivotal connection 110 between the door 104 and the extension panel 78. The retention spring 108 biases the door 104 to a closed position 112, as shown in FIG. 6. The door 104 may be pivoted against the spring bias to raise the door 104 away from the extension panel 78 and to expose the entry aperture 91, defining an open position 34 of the door 104, as shown in FIG. 6A. In the illustrated embodiment, the open position 34 is further defined by exposing the first tie-down connector 84 on the cargo floor 20 for access by a user, although it is contemplated that the second tie-down connector 86 includes a substantially identical arrangement. Further, the user may use the illustrated tie-down connector 84 by raising a ring 116 of the tie-down connector 84 that is pivotally coupled with a base portion 117 of the tie-down connector. Raising the ring 116 upward extends the ring 116 through the access aperture 90 and the entry aperture 91. For example, a user may use either or both the tie-down connectors 84, 86 to secure an object resting on the extension panel 78 by raising the door 104 and attaching a bungee or elastomeric cord, a tie-down strap, or other conceivable tie-down attachment, to the ring 116 of the tie-down connector.

As shown in FIGS. 7-7A, the first seatback 38 is shown in the forward stowed position 18 exposing a portion of the load and extension panels 78. The second seatback 40 is in the upright position 16, restricting the extension panel 78 from sliding to the forward position 26. As also shown, the extension panel 78 is in the non-deployed position 81, whereby the support surface 94 of the extension panel 78 is in abutting contact with the top surface 88 of the load panel 22. It is contemplated that the upright position 16 of the seatback 14 as shown may include other substantially upright orientations or angles of the seatback 14, relative to the seat 44 such as a slightly more reclined angle or a substantially more upright angle relative to the seat 44 of the rear row of seating 36.

Figure 8:
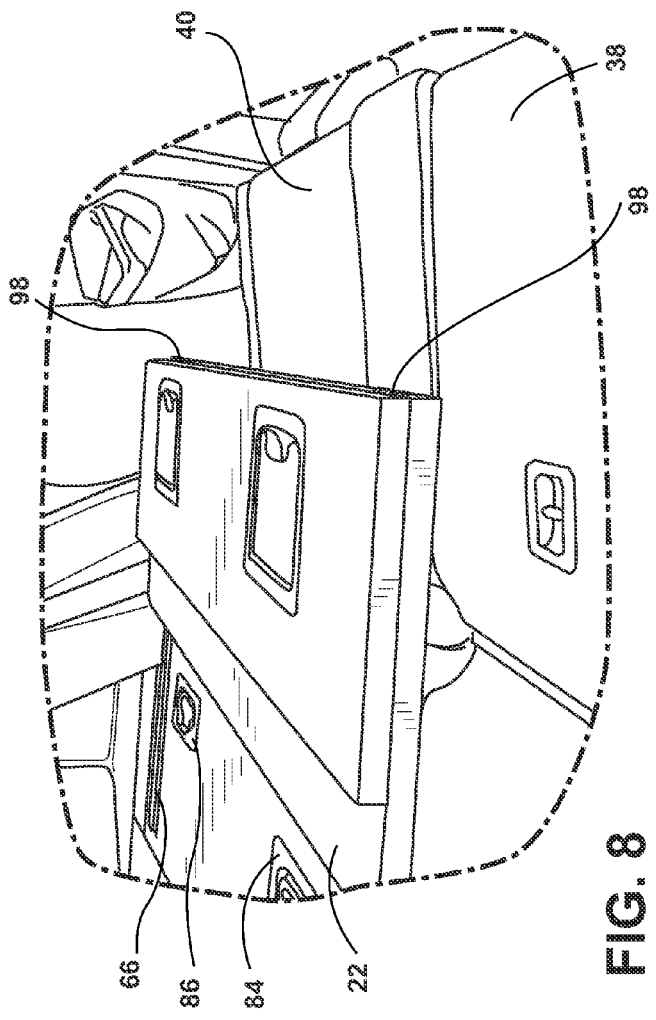
FIG. 8 is a top perspective view of the load floor assembly with the seatback in the forward stowed position.
Figure 8A:
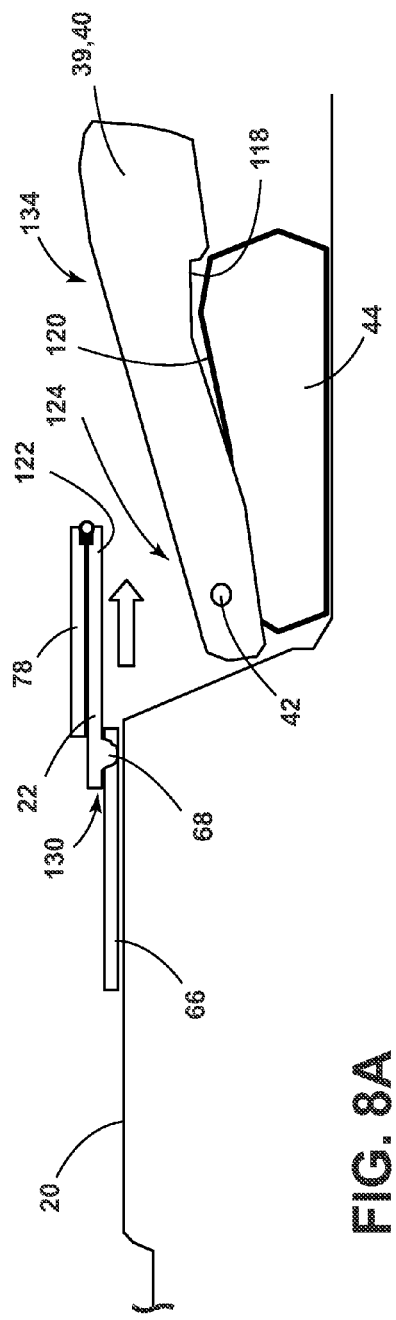
FIG. 8A is a schematic side elevational view of the load floor assembly, as shown in FIG. 8, having the load panel in a forward position over a lower portion of the seatback.

As illustrated FIGS. 8-8A, the first and second seatbacks 38, 40 are pivoted to the forward stowed position 18 wherein a back support surface 118 of the seatback 14 is in generally abutting contact with a seat surface 120 of the seat 44. The load panel 22 is slid forward on the track assembly 64 to the forward position 26 where a forward portion 122 of the load panel 22 extends over at least a lower portion 124 of the seatback 14. As such, a front portion 126 of the rail supports the slider proximate a rearward edge 130 of the load panel 22. To move the load panel 22 to the forward position 26, it is contemplated that a locking mechanism may be included on the track assembly 64 to disengage the slide from the rail and allow the slide to move forward relative to the rail and reengage the rail upon reaching the forward position 26. As shown in FIG. 8, moving the load panel 22 to the forward position 26 uncovers the first and second tie-down connectors 84, 86 to allow the tie-down connectors to remain accessible and usable to secure an object in the cargo area 48.

Figure 9:
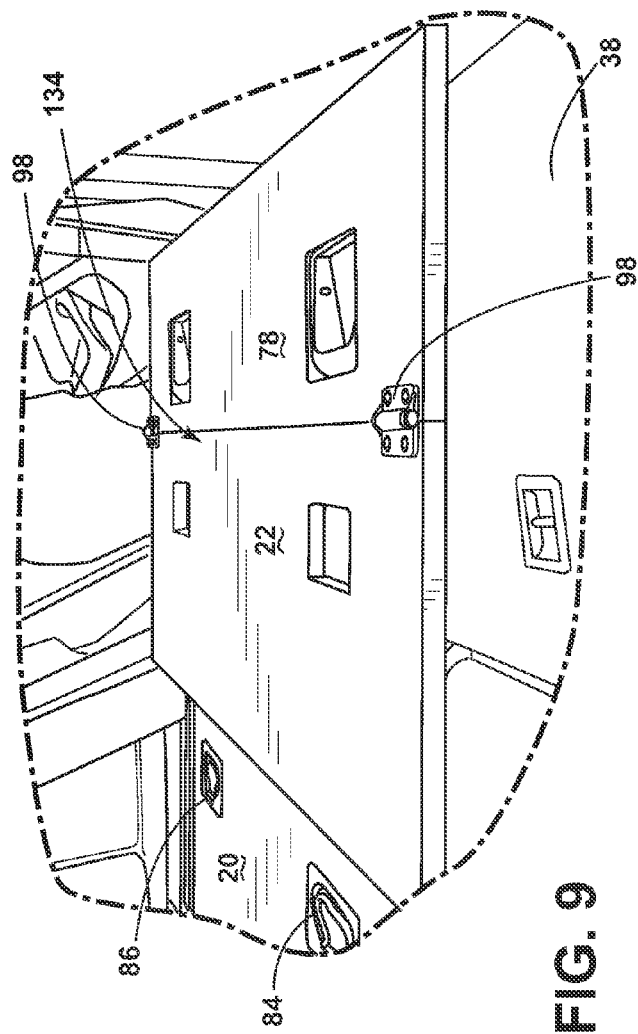
FIG. 9 is a top perspective view of the load floor assembly showing the load panel in the forward position and the extension panel in a deployed position.
Figure 9A:
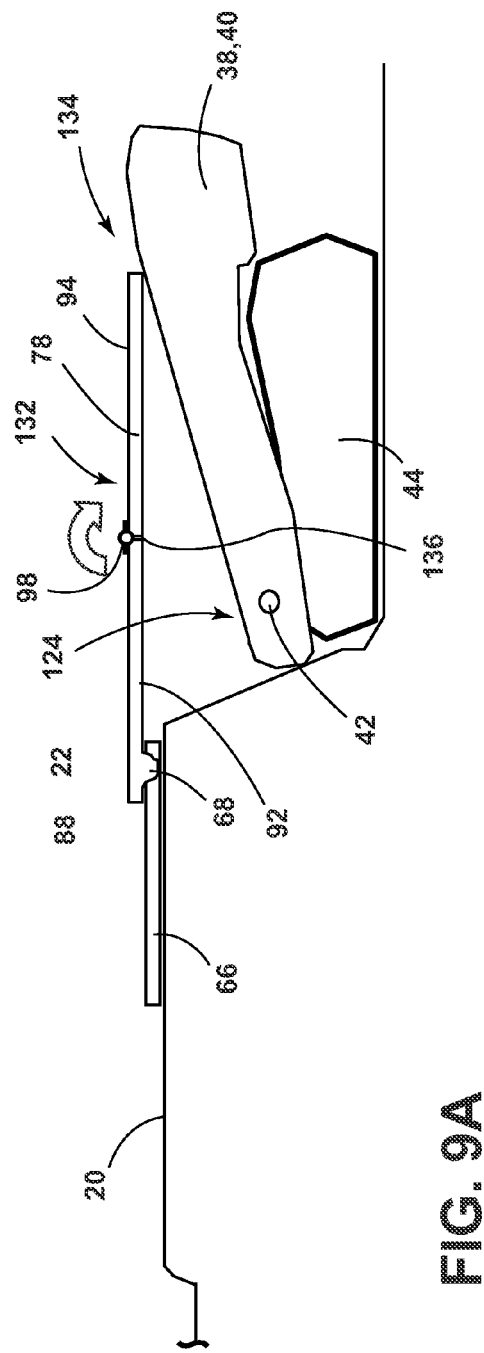
FIG. 9A is a schematic side elevational view of the load floor assembly, as shown in FIG. 9, having the seatback in the forward stowed position and the extension panel abutting the seatback.

As shown in FIGS. 9-9A, the extension panel 78 is rotated forward about the front edge 76 of the load panel 22 from the non-deployed position 81 (FIGS. 8-8A) to the deployed position 80. Upon rotating the extension panel 78 forward to the deployed position 80, the support surface 94 of the extension panel 78 is substantially aligned with the top surface 88 of the load panel 22, defining a substantially planar cargo surface 132 forward and in general alignment with the elevated portion 56 of the cargo floor 20. In addition, the extension panel 78 in the deployed position 80 engages an upper portion 134 of the seatback 14, as shown in FIG. 9A. It is contemplated that the extension panel 78 may engage with the attachment features on the upper portion 134 of the seatback 14 or may otherwise reside slightly above the upper portion 134 of the seatback 14. The pair of hinges 98 coupled between the load panel 22 and the extension panel 78, provide, in combination with substantially perpendicular edge surfaces 136 of the extension panel 78 and load panel 22, a connection between the extension panel 78 and the load panel 22 that maintains the top surface 88 of the load panel 22 in alignment with the support surface 94 of the extension panel 78. Accordingly, the top surface 88 and the support surface 94 are substantially co-planar in the illustrated embodiment to support an object preferably carried on a flat surface or other objects.

The described steps in moving the load panel 22 from the rearward position 24 to the forward position 26 and similarly, moving the extension panel 78 from the non-deployed position 81 to the deployed position 80 may be reversed to move the load panel 22 and the extension panel 78 back to the rearward and non-deployed positions 24, 81, respectively. It is also contemplated that the load panel 22 may slide back to the rearward position 24 prior to the extension panel 78 being rotated from the deployed position 80 back to the non-deployed position 81. It is further contemplated that additional panels may be included to span between the cargo floor 20 and the upper portion 82 of the seatback 14 to provide a substantially planar support surface 94 to support a cargo item and to expand the usable cargo area 48 of a vehicle 12. Also, it is contemplated that extension panel 78 and the load panel 22 may be divided to correlate with the split seatback arrangement, such that a first side load panel 22 and extension panel 78 and a second side load panel 22 and extension panel 78 may each be moved forward and deployed individually to only require the corresponding first or second seatback 38, 40 immediately forward the first or second side load panel 22 and extension panel 78 to be in the forward stowed position 18, not the entire seatback 14 of the rear row of seating 36.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle load floor assembly, comprising:
    a seatback pivotal between upright and stowed positions;
    a cargo floor having an elevated portion extending rearward of the seatback;
    a load panel coupled with the elevated portion; and
    a track assembly having a rail slidably engaged with a slider, together coupled between the load panel and the elevated portion for sliding the load panel forward over at least a lower portion of the seatback in the stowed position.

2. The vehicle load floor assembly of claim 1, wherein a forward edge of the load panel is spaced from the seatback.

3. The vehicle load floor assembly of claim 1, further comprising:
    an extension panel coupled with the load panel and deployable forward to a deployed position in general alignment with the load panel.

4. The vehicle load floor assembly of claim 3, wherein the load panel in the forward position is generally aligned with the cargo floor, and wherein the extension panel in the deployed position detachably engages an upper portion of the seatback.

5. The vehicle load floor assembly of claim 3, wherein the extension panel is pivotally coupled with a forward edge of the load panel, and wherein the extension panel pivots between a non-deployed position and the deployed position.

6. The vehicle load floor assembly of claim 5, wherein the extension panel engages the upper portion of the seatback in the deployed position.

7. The vehicle load floor assembly of claim 5, wherein the extension panel includes a support surface configured to support at least one cargo item in the deployed position, and wherein the load panel abuts the support surface when the extension panel is in the non-deployed position.

8. A vehicle load floor assembly, comprising:
    a seat having a seatback pivotable to a collapsed position;
    a cargo floor elevated rearward the seat;
    a rail coupled with the cargo floor;
    a load panel having a slider coupled with the rail and slidable horizontally from a rearward position to a forward position extending over the seatback in the collapsed position; and
    an extension panel coupled with the load panel and deployable forward from the load panel.

9. The vehicle load floor assembly of claim 8, wherein the rail is coupled with an elevated portion of the cargo floor.

10. The vehicle load floor assembly of claim 8, further comprising:
    a tie-down connector coupled with the cargo floor; and
    an access aperture extending through the load panel, wherein the access aperture is aligned with the tie-down connector when the load panel is in the rear position.

11. The vehicle load floor assembly of claim 8, wherein the extension panel is pivotal between a non-deployed position and a deployed position, wherein the extension panel in generally aligned with the load panel in the deployed position.

12. The vehicle load floor assembly of claim 11, wherein the extension panel engages the upper portion of the seatback in the deployed position.

13. The vehicle load floor assembly of claim 8, wherein the seat includes two laterally adjacent seats within a vehicle passenger compartment, and wherein the seatback abuts the at least one of the seats in the collapsed position.

14. The vehicle load floor assembly of claim 8, wherein the extension panel is pivotally coupled with a forward edge of the load panel and pivotal to a deployed position forward from and in general alignment with the load panel.

15. A load floor assembly, comprising:
    a track assembly configured to engage an elevated portion of a cargo floor rearward a vehicle seat;
    a load panel coupled with the track assembly for sliding to a forward position in general alignment with and beyond the elevated portion;
    an extension panel pivotally coupled with a front portion of the load panel and pivotal to a deployed position in alignment with the load panel;
    a first aperture extending through the load panel, wherein the first aperture is configured to align with a tie-down connector on the cargo floor when the load panel is in a rearward position;
    a second aperture extending through the extension panel that is aligned with the first aperture when the extension panel in a non-deployed position; and
    a door substantially covering the second aperture and pivotally coupled with the extension panel, wherein the door is pivotal to an open position for accessing the tie-down connector on the cargo floor.

16. The load floor assembly of claim 15, wherein the extension panel in the deployed position and the load panel define a support surface configured to support at least one cargo item.

17. The load floor assembly of claim 15, wherein a top surface of the load panel abuts a support surface of the extension panel when the extension panel is in a non-deployed position and substantially aligns with the support surface when the extension panel is in the deployed position.

* * * * *